Patented Jan. 15, 1924.

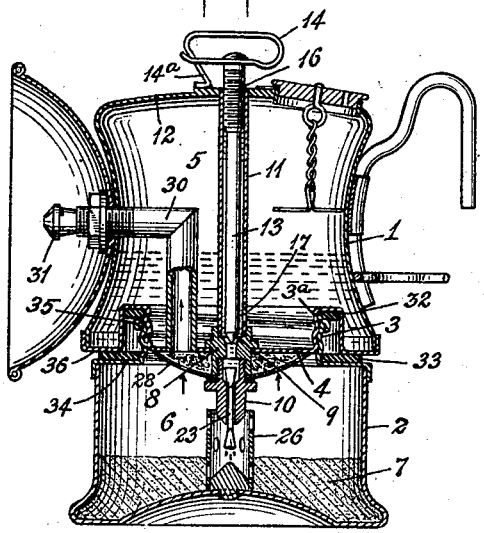

1,481,079

UNITED STATES PATENT OFFICE.

DOMINGO ANGLADA, OF NEW YORK, N. Y., ASSIGNOR TO WOLF SAFETY LAMP CO. OF AMERICA, INC., OF BROOKLYN, NEW YORK, A CORPORATION OF NEW YORK.

ACETYLENE GENERATOR.

Application filed May 5, 1920. Serial No. 379,015.

*To all whom it may concern:*

Be it known that I, DOMINGO ANGLADA, a citizen of the United States, residing in the borough of the Bronx, city and State of New York, have invented certain new and useful Improvements in Acetylene Generators, of which the following is a specification.

The invention relates to an acetylene lamp. The device is intended for use as a miner's lamp or on bicycles, automobiles, generators, or for analogous purposes.

The feature of novelty in this invention consists in providing an acetylene lamp with a double non-leaking joint between the water reservoir and the carbide chamber, so that neither gas nor water may escape at the joint.

Figure 1 is a central vertical section of the complete lamp; Fig. 2 is a top view of the complete lamp; Fig. 3 is an enlarged detail section of the water feed valves shown in Fig. 1, the valves being open.

The acetylene lamp shown in the drawings, constitutes the metallic receptacles 1 and 2 which are united by the threads 3 and 3ª, and may by said means be readily detached. The partition 4 separates the receptacles 1 and 2. The upper receptacle 1 serves as a water reservoir 5 and the lower receptable 2 serves as a gas generating chamber 6 adapted to contain calcium carbide 7.

The partition 4 has a short section of tubing 8 secured therein. A primary control valve 9 is situated near the upper end of the tubing 8 and a secondary needle valve 10 at the lower end thereof.

The primary valve 9 consists of the tube 11 extending through the upper wall 12 of the water receptacle 1 and contains a stem 13, the upper end thereof having the finger piece 14 secured thereto and the lower end being cone shaped at 15 and adapted to be moved upwardly and downwardly, by means of the thread 16 whereby it moves away from or into tight engagement with its seat 18. Water escapes from the reservoir 5, to the control valve 9, through the port 17. It will be readily understood that the flow of water from the reservoir may be permitted or stopped entirely by manipulation of the stem 13 toward or away from the seat 18.

The secondary needle valve 10 is secured to the tubing 8 by the screw threads 19 so that it may be readily removed therefrom. The secondary valve 10 comprises the nipple 20 having a channel 21 therethrough and a needle 23 loosely secured therein by flattening both ends 24 and 25 thereof. The relative size of the channel 21 and needle 23 are so proportioned that the space between them will pass an amount of water necessary to maintain such a generation of gas as to give a flame of sufficient intensity and steadiness for all practical purposes. By this construction it is only necessary to manipulate the primary valve 9 so as to open it to permit a flow of water to the secondary valve 10, which regulates the flow of water to the carbide in a predetermined, constant and unvarying amount.

The water trickles on the surface of the needle 23 and drops from the flattened end thereof into the perforated cup 26 and then passes to the carbide. The generated gas passes through the perforations 27 in the convex annular plate 28, through the filter mass 29, through the tube 30 to the burner 31.

The feature of novelty in this invention resides in the seal between the receptacles 1 and 2. The depressed portion of the partition 4 has an annular gasket 32 fitting therein and close to the threaded portion 3ª thereof. A second annular gasket 33 is placed on the upper surface 34 of the receptacle 2 and fits closely around its threaded portion 3. When the two receptacles 1 and 2 are screwed together the edge 35 of the upstanding thread portion 3 fits tightly against the gasket 32 and the shoulder 36 of the receptacle 1 fits closely against the gasket 33, thereby insuring a double seal against the escape of gas.

The finger piece 14 is provided with a depending spring finger 14ª which engages with the milled surface 14ᵇ, thereby keeping the valve stem locked in whatever position it is adjusted to.

If it is desired to operate the lamp so that gas may be generated over or under the full capacity of the secondary valve 10, the needle 23 of the said valve 10 should be removed and the flow of water regulated by use of the primary valve 9 as desired.

I claim:

In an acetylene lamp, in combination, a carbide chamber, a water reservoir, a partition secured to said reservoir and separating the reservoir and chamber, a portion of said partition being shaped to form spaced inner and outer walls, an annular groove between the walls, a washer at the base of said groove, an annular shoulder extending horizontally from said outer wall, screw threads on the inner of said walls, an annular screw threaded flange extending upwardly from the top surface of the carbide chamber, and spaced inwardly from the outer edge thereof and inwardly from the said outer wall, a horizontal annular shoulder extending from the base of said flange, a washer on the last mentioned shoulder, the said screw threads being adapted to secure the reservoir and chamber together, the upper edge of the flange being adapted to seat on the washer in said groove and the last mentioned washer being adapted to be held between said shoulders.

In testimony whereof I have hereunto set my hand.

DOMINGO ANGLADA.